United States Patent
Kitagawa et al.

(10) Patent No.: US 9,845,689 B2
(45) Date of Patent: Dec. 19, 2017

(54) TURBINE EXHAUST STRUCTURE AND GAS TURBINE

(75) Inventors: Hitoshi Kitagawa, Tokyo (JP); Yasuro Sakamoto, Tokyo (JP); Eisaku Ito, Tokyo (JP)

(73) Assignee: MITSUBISHI HEAVY INDUSTRIES, LTD., Tokyo (JP)

(*) Notice: Subject to any disclaimer, the term of this patent is extended or adjusted under 35 U.S.C. 154(b) by 833 days.

(21) Appl. No.: 14/008,434

(22) PCT Filed: Mar. 22, 2012

(86) PCT No.: PCT/JP2012/057388
§ 371 (c)(1),
(2), (4) Date: Oct. 10, 2013

(87) PCT Pub. No.: WO2012/133123
PCT Pub. Date: Oct. 4, 2012

(65) Prior Publication Data
US 2014/0023493 A1 Jan. 23, 2014

(30) Foreign Application Priority Data
Mar. 29, 2011 (JP) .................. 2011-073027

(51) Int. Cl.
*F01D 9/02* (2006.01)
*F01D 25/30* (2006.01)
*F02C 7/00* (2006.01)

(52) U.S. Cl.
CPC ............... *F01D 9/02* (2013.01); *F01D 25/30* (2013.01); *F02C 7/00* (2013.01); *F05D 2250/52* (2013.01); *F05D 2260/213* (2013.01)

(58) Field of Classification Search
CPC ... F01D 9/02; F01D 9/04; F01D 9/047; F01D 9/06; F01D 9/065; F01D 25/30;
(Continued)

(56) References Cited

U.S. PATENT DOCUMENTS 2,674,845 A * 4/1954 Pouchot .................... F23R 3/18
415/176
5,020,318 A * 6/1991 Vdoviak ................ F01D 9/065
60/226.1
(Continued)

FOREIGN PATENT DOCUMENTS

CN 1123879 A 6/1996
DE 19737507 A1 3/1999
(Continued)

OTHER PUBLICATIONS

Japanese Office Action dated Oct. 27, 2015 issued in counterpart Japanese patent application No. 2011-073027, with English translation. (7 pages).
(Continued)

*Primary Examiner* — Craig Kim
*Assistant Examiner* — Alexander White
(74) *Attorney, Agent, or Firm* — Westerman, Hattori, Daniels & Adrian, LLP (57) ABSTRACT

In a turbine exhaust structure and a gas turbine, a turbine casing (26) formed in an annular shape to constitute a combustion gas passage A is provided. An exhaust diffuser (31) formed in an annular shape to constitute a flue gas passage (B) is connected to the turbine casing (26) to constitute a configuration. By providing a pressure loss body (61) in the exhaust diffuser (31), efficient pressure recovery can be carried out, which improves turbine efficiency, thereby enabling improvement of the performance.

8 Claims, 6 Drawing Sheets

(58) Field of Classification Search
CPC .... F02C 7/00; F05D 2220/60; F05D 2220/62; F05D 2240/128; F05D 2250/52; F05D 2260/205; F05D 2260/208; F05D 2260/213
See application file for complete search history.

(56) References Cited

U.S. PATENT DOCUMENTS

| | | | |
|---|---|---|---|
| 5,791,136 A * | 8/1998 | Utamura | F01D 5/145 415/115 |
| 5,813,828 A * | 9/1998 | Norris | F01D 25/30 415/115 |
| 7,578,369 B2 | 8/2009 | Francisco et al. | |
| 2009/0078496 A1 | 3/2009 | Francisco et al. | |
| 2010/0021291 A1 | 1/2010 | Beeck | |
| 2010/0071342 A1* | 3/2010 | Siden | F01D 25/30 60/39.182 |
| 2010/0146980 A1* | 6/2010 | Strom | F02K 1/825 60/770 |
| 2010/0226767 A1 | 9/2010 | Becker et al. | |

FOREIGN PATENT DOCUMENTS

| | | |
|---|---|---|
| JP | 53-219825 | 9/1988 |
| JP | 08-042306 A | 2/1996 |
| JP | 08-061087 A | 3/1996 |
| JP | 08-260905 A | 10/1996 |
| JP | 2002-364310 A | 12/2002 |
| JP | 3513170 B2 | 3/2004 |
| JP | 2006-183665 A | 7/2006 |
| JP | 2009-030512 A | 2/2009 |
| JP | 2009-203871 A | 9/2009 |
| JP | 2010-509534 A | 3/2010 |
| JP | 2010-071282 A | 4/2010 |
| JP | 2010-242752 A | 10/2010 |
| JP | 2011-032900 A | 2/2011 |

OTHER PUBLICATIONS

Decision of a Patent Grant dated May 10, 2016, issued in counterpart Japanese Patent Application No. 2011-073027, with English translation. (4 pages).
Japanese Office Action dated Feb. 24, 2015, issued in corresponding JP Patent Application No. 2011-073027 with English translation (6 pages).
Chinese Notice of Allowance dated Jan. 21, 2015, issued in corresponding CN Patent Application No. 201280015503.5 (4 pages).
Korean Notice of Allowance dated Mar. 26, 2015, issued in corresponding Patent Application No. 10-2013-7025437 with English partial translation (3 pages).
Extended European Search Report dated Sep. 10, 2014, issued in corresponding European Application No. 12763837.7.(6 pages).
Chinese Office Action dated Sep. 22, 2014, issued in corresponding Chinese Application No. 201280015503.5; w/ English Translation. (14 pages).
Korean Office Action dated Sep. 25, 2014, issued in corresponding Korean Application No. 2013-7025437; w/ English Translation. (13 pages).
International Search Report dated May 15, 2012, issued in corresponding application No. PCT/JP2012/057388.
Written Opinion dated May 15, 2012, issued in corresponding application No. PCT/JP2012/057388.
Communication under Rule 71(3) EPC (Intention to Grant) dated Nov. 10, 2016, issued in counterpart European Patent Application No. 12763837.7. (7 pages). Statement of Relevance: The Intention to Grant has been issued.

* cited by examiner

COOLING MEDIUM

TURBINE EXHAUST STRUCTURE AND GAS TURBINE

FIELD

The present invention relates to a turbine exhaust structure arranged in the rear of a turbine in, for example, a gas turbine in which fuel is supplied to the compressed air having high temperature and high pressure to create combustion and the combustion gas is supplied to a turbine to obtain rotational power, and to a gas turbine to which the turbine exhaust structure is applied.

BACKGROUND

A gas turbine is configured with a compressor, a combustor, and a turbine. The air inhaled from the air intake is compressed by the compressor to produce compressed air having high temperature and high pressure. In the combustor, fuel is supplied to the compressed air to create combustion, and the combustion gas having high temperature and high pressure drives the turbine, thereby driving a generator connected to the turbine. In this case, the turbine is configured so as that a plurality of turbine nozzles and turbine blades arranged one after the other in a case. The combustion gas drives the blade so as to rotationally drive an output shaft to which the generator is connected. The energy of the combustion gas (flue gas) which drives the turbine is gradually transformed into pressure in an exhaust diffuser so as not to produce loss, and is ejected into atmospheric air.

In the turbine of a gas turbine configured in such manner, the exhaust diffuser is configured so as that the flow area of the exhaust diffuser increases toward the flow direction of flue gas from a turbine exit, or a diffuser inlet, and the flow velocity of the flue gas from which the power is recovered by the turbine can be reduced, thereby recovering pressure.

The gas turbine having such exhaust diffuser includes, for example, a gas turbine described in Patent Literature 1 as listed below.

CITATION LIST

Patent Literature

Patent Literature 1: Japanese Laid-open Patent Publication No. 2009-203871

SUMMARY

Technical Problem

In the exhaust diffuser described above, when an amount of pressure recovery increases by reducing the velocity of the flue gas, the turbine efficiency improves, thereby improving the performance of the gas turbine. It is effective to provide an outlet flow area larger than an inlet flow area in order to increase the amount of pressure recovery in the exhaust diffuser. However, if the outlet flow area is notably larger than the inlet flow area in the exhaust diffuser, the flue gas flow separates in the vicinity of the wall surface in the outer circumference side or in the vicinity of the wall surface in the center portion of the exhaust diffuser, thereby reducing the amount of pressure recovery. On the other hand, if it is configured so as the outlet flow area not to be notably large compared to the inlet flow area in the exhaust diffuser, the exhaust diffuser becomes long in the longitudinal direction (flow direction of flue gas), which results in a massive size of the exhaust diffuser.

The present invention provides a solution to the problem described above. An object of the present invention is to provide a turbine exhaust structure and a gas turbine, which can improve performance by improving turbine efficiency by providing efficient pressure recovery of flue gas.

Solution to Problem

According to an aspect of the present invention, in a turbine exhaust structure including a casing formed in an annular shape to constitute a combustion gas passage, in which an exhaust diffuser formed in an annular shape to constitute a flue gas passage is connected to the casing, a pressure loss body is provided in the exhaust diffuser.

Therefore, by providing the pressure loss body in the exhaust diffuser, after the power is recovered from the combustion gas, the flue gas flows into the exhaust diffuser in which the flue gas flow is controlled to be uniform by the pressure loss body. Thereby, the separation of the flue gas in the vicinity of the wall surface of the exhaust diffuser is restrained, which increases the amount of pressure recovery of the flue gas in this region. As a result, an efficient pressure recovery is carried out, which improves turbine efficiency, thereby enabling improvement of the performance.

Advantageously, in the turbine exhaust structure, the pressure loss body includes a porous member arranged in the flue gas passage of the exhaust diffuser.

Therefore, by configuring the pressure loss body with the porous member arranged in the flue gas passage, not only that the efficient pressure recovery of the flue gas can be obtained but also that the stiffness of the exhaust diffuser can be raised while still maintaining the structural simplicity.

Advantageously, in the turbine exhaust structure, the pressure loss body includes a heat transfer tube in which heat is exchanged between a flue gas and a heat exchange medium flowing inside the heat transfer tube.

Therefore, by configuring the pressure loss body with a heat transfer tube, the efficient pressure recovery of the flue gas can be carried out and also the heat energy in the flue gas can efficiently be recovered.

Advantageously, in the turbine exhaust structure, the pressure loss body is designed so as that a pressure loss in at least one of radially outer side or inner side of the exhaust diffuser is smaller than a pressure loss in a radially middle portion of the exhaust diffuser.

Therefore, the flue gas flowing in the exhaust diffuser flows from the radially middle portion in which the pressure loss is large toward the radially outer side or inner side in which the pressure loss is small. As a result, the separation of the flue gas in the vicinity of the wall surface of the exhaust diffuser is restrained, thereby increasing the amount of pressure recovery.

Advantageously, in the turbine exhaust structure, a support structure penetrating the exhaust diffuser in a radial direction is provided, and the pressure loss body is arranged in a downstream side of the support structure in a flow direction of a flue gas.

Therefore, by arranging the pressure loss body in the downstream side of a strut in which the flue gas tends to separate from the vicinity of the wall surface, the separation of the flue gas from the vicinity of the wall surface of the exhaust diffuser can efficiently be restrained.

According to another aspect of the present invention, in a gas turbine in which a fuel is supplied to the compressed air compressed in a compressor in a combustor to create combustion, and the produced combustion gas is supplied to a turbine to obtain rotational power, the turbine is configured so as that a turbine nozzle assembly and a turbine blade assembly are arranged inside an annular-shaped casing one after another along a flow direction of a flue gas, an annular-shaped exhaust diffuser is connected to the casing to constitute a configuration, and a pressure loss body is provided in the exhaust diffuser.

Therefore, by providing the pressure loss body in the exhaust diffuser, after the power is recovered from the combustion gas, the flue gas flows into the exhaust diffuser, and the flow is controlled to be uniform by the pressure loss body. Thereby, the separation of the flue gas in the vicinity of the wall surface of the exhaust diffuser is restrained, which increases the amount of pressure recovery in this region. As a result, an efficient pressure recovery of the flue gas is carried out, which improves turbine efficiency, thereby enabling improvement of the performance of the gas turbine.

Advantageous Effects of Invention

According to the turbine exhaust structure and the gas turbine of the present invention, the pressure loss body is provided in the exhaust diffuser, and therefore the flue gas flowing into the exhaust diffuser is controlled to be uniform by the pressure loss body. Thereby, the separation of the flue gas in the vicinity of the wall surface of the exhaust diffuser is restrained, which increases the amount of pressure recovery in this region. As a result, an efficient pressure recovery is carried out, which improves turbine efficiency, thereby enabling improvement of the performance.

DESCRIPTION OF EMBODIMENTS

A preferable embodiment of a turbine exhaust structure and a gas turbine according to the present invention will be described in detail below referring to attached drawings. The present invention is not limited to the embodiment, and includes a combination configured with the embodiments when a plurality of embodiments is provided.

First Embodiment

Figure 1:
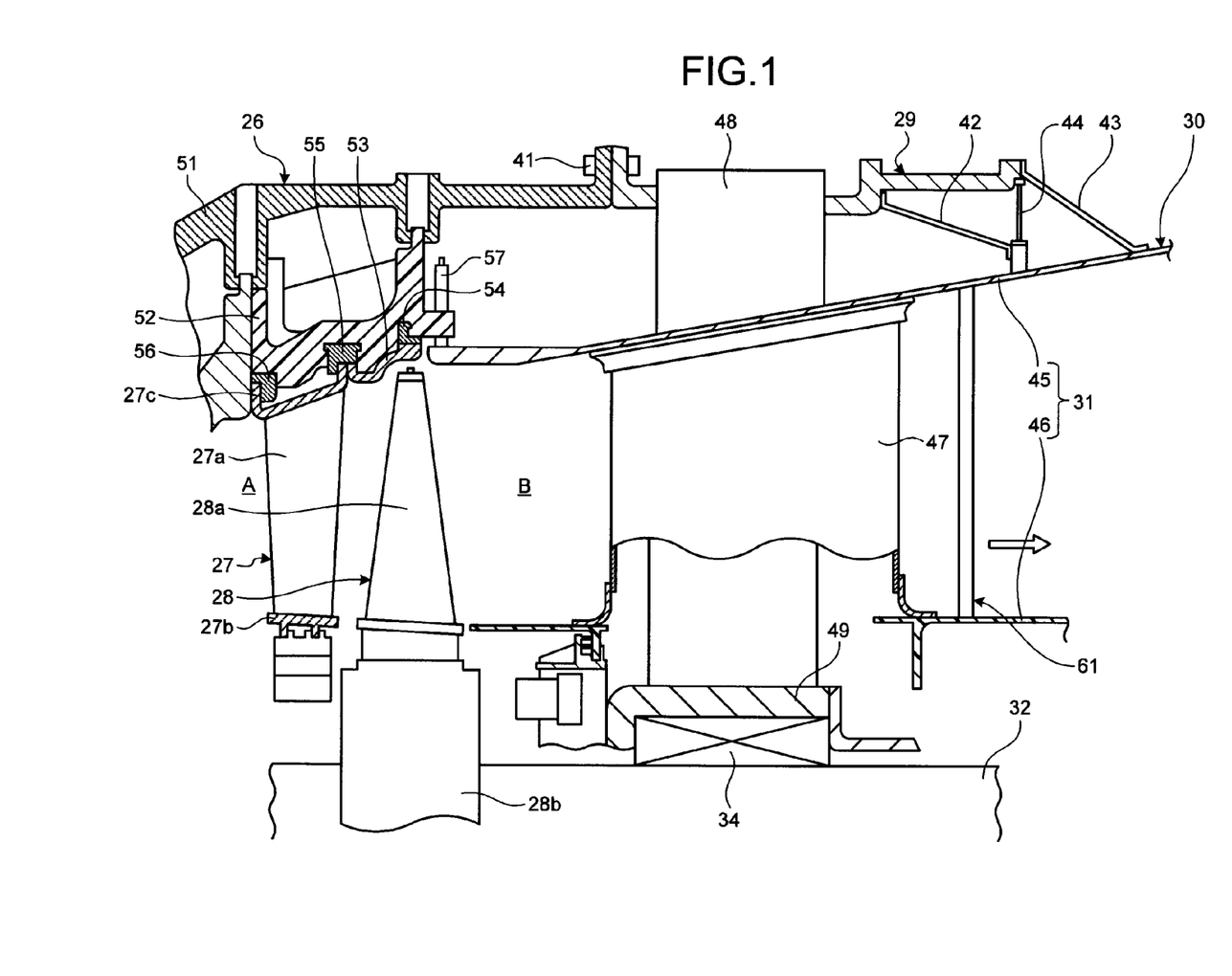
FIG. 1 is a schematic view illustrating a turbine exhaust structure of a gas turbine according to a first embodiment of the present invention.
Figure 2:
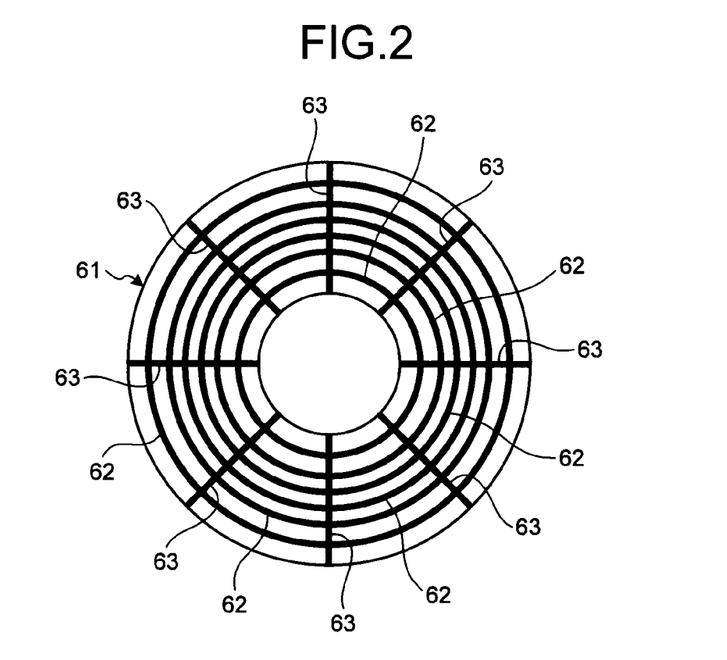
FIG. 2 is a front view illustrating a pressure loss body of a turbine exhaust structure according to the first embodiment.
Figure 3:
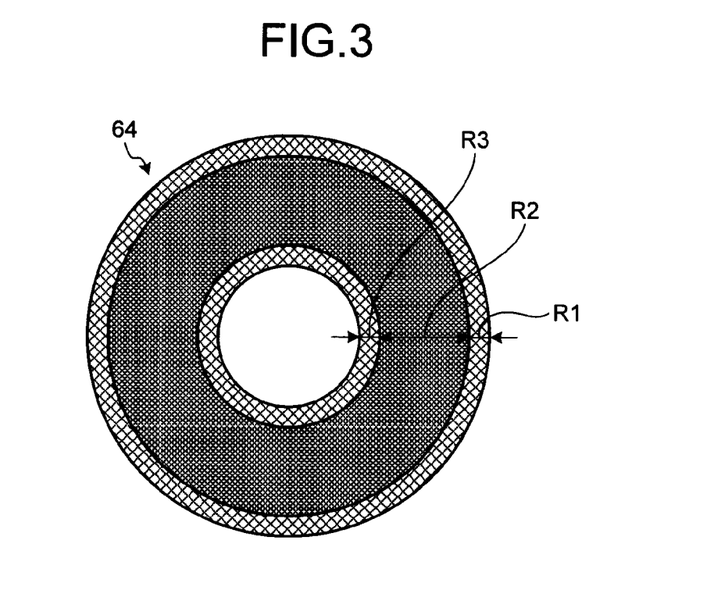
FIG. 3 is a front view illustrating another pressure loss body of a turbine exhaust structure according to the first embodiment.
Figure 4:
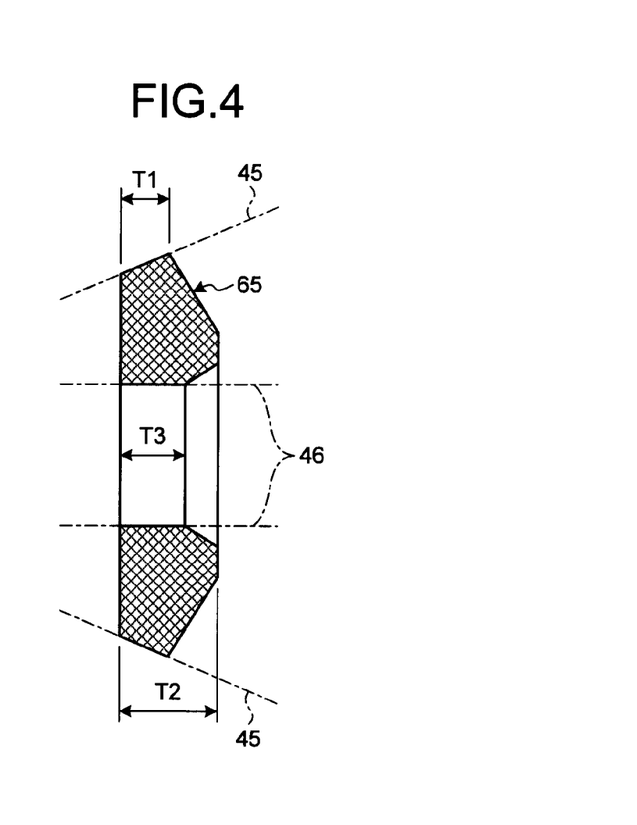
FIG. 4 is a side view illustrating another pressure loss body of a turbine exhaust structure according to the first embodiment.
Figure 5:
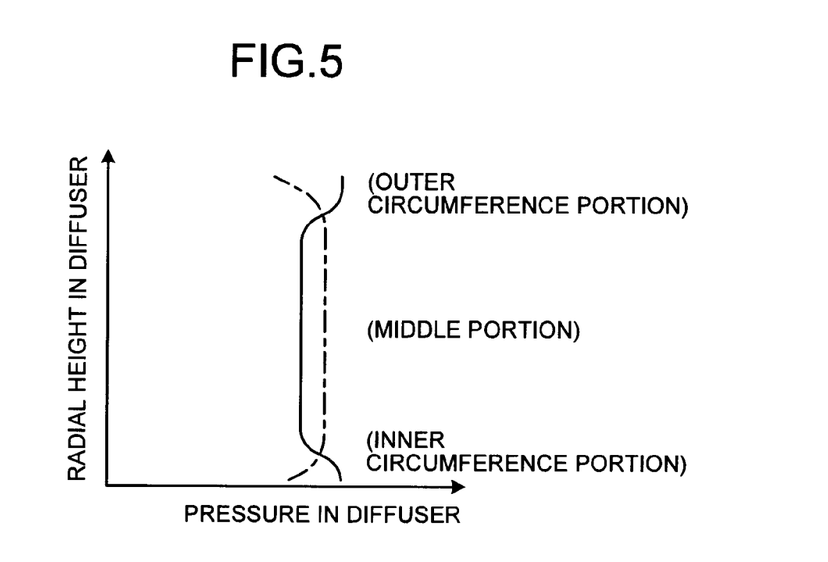
FIG. 5 is a chart illustrating pressure distribution in relation with a radial height in an exhaust diffuser.
Figure 6:
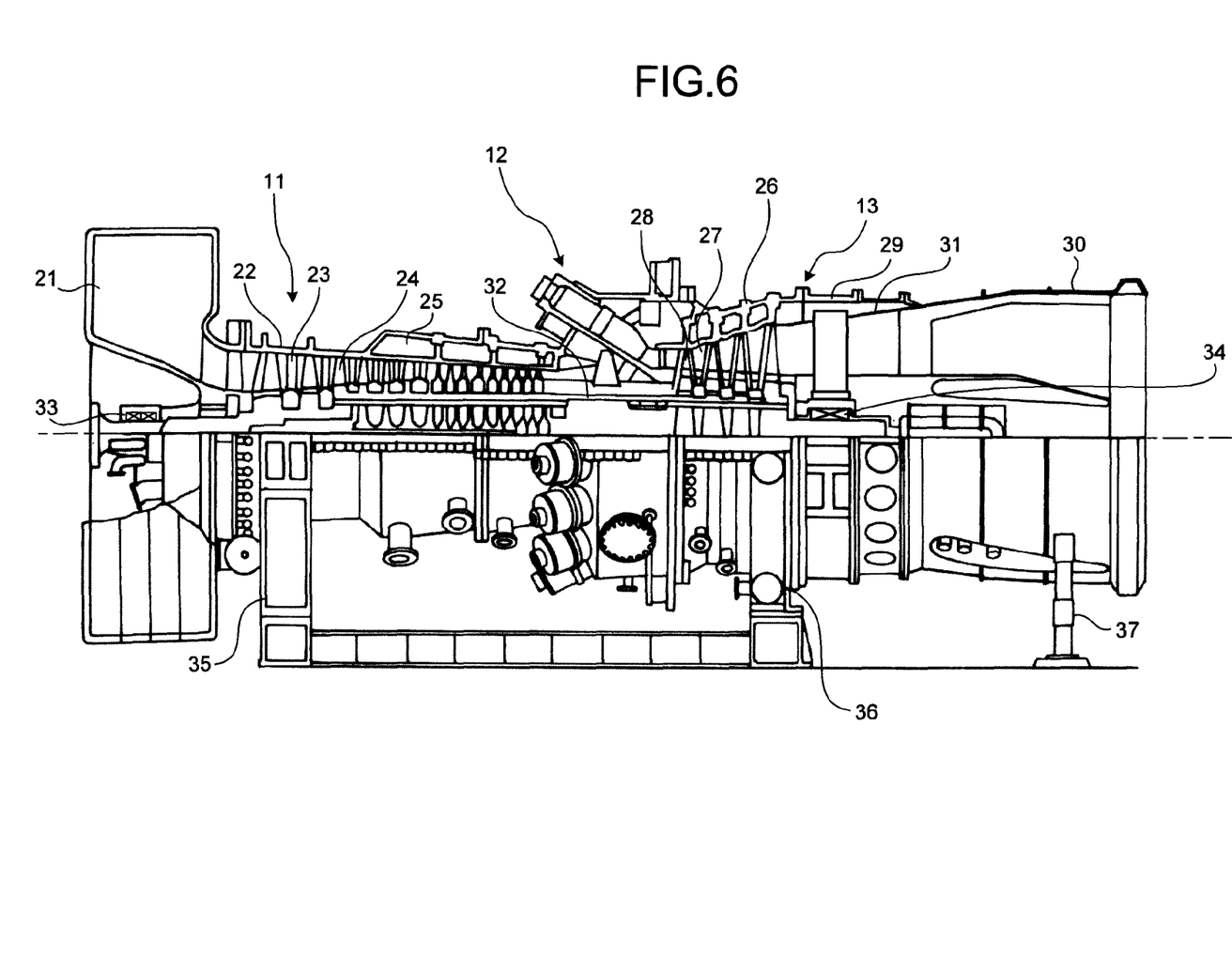
FIG. 6 is a schematic view illustrating a gas turbine according to the first embodiment.

FIG. 1 is a schematic view illustrating a turbine exhaust structure of a gas turbine according to a first embodiment of the present invention, FIG. 2 is a front view illustrating a pressure loss body of a turbine exhaust structure according to the first embodiment, FIG. 3 is a front view illustrating another pressure loss body of a turbine exhaust structure according to the first embodiment, FIG. 4 is a side view illustrating another pressure loss body of a turbine exhaust structure according to the first embodiment, FIG. 5 is a chart illustrating pressure distribution in relation with a radial height in an exhaust diffuser, and FIG. 6 is a schematic view illustrating a gas turbine according to the first embodiment.

A gas turbine according to the first embodiment is configured with a compressor 11, a combustor 12, and a turbine 13 as illustrated in FIG. 6. A generator not illustrated in the drawing is connected so as to be able to generate power.

The compressor 11 includes an air intake 21 for inhaling air, and is configured with a plurality of compressor nozzle assemblies 23 and compressor blade assemblies 24 arranged one after the other in the front and rear direction (axial direction of rotor 32 which will be described later) inside a compressor casing 22. A bleed chamber 25 is provided in the outer side of the compressor 11. The combustor 12 supplies fuel to the compressor air compressed in the compressor 11 and can create combustion by ignition. In the turbine 13, a plurality of turbine nozzle assemblies 27 and turbine blade assemblies 28 is arranged one after the other in the front and rear direction (axial direction of rotor 32 which will be described later) inside a turbine casing (casing) 26. In the downstream of the turbine casing 26, an exhaust chamber 30 is arranged via the exhaust casing 29 and the exhaust chamber 30 includes an exhaust diffuser 31 which is continuously connected to the turbine 13.

Further, a rotor (turbine shaft) 32 is positioned to penetrate the center portion of the compressor 11, a combustor 12, the turbine 13, and the exhaust chamber 30. As for the rotor 32, the end portion of the rotor 32 in the compressor 11 side is rotatably supported by a bearing 33 while the end portion of the rotor 32 in the exhaust chamber 30 side is rotatably supported by a bearing 34. In the rotor 32, a plurality of disks to which each of the compressor blade assemblies 24 is installed is stacked and fixed together in the compressor 11, and a plurality of disks to which each of the turbine blade assemblies 28 is installed is stacked and fixed together in the turbine 13. A drive shaft of a generator, which is not illustrated in the drawing, is connected to the end portion in the compressor 11 side.

As for the gas turbine, the compressor casing 22 of the compressor 11 is supported by a stand 35, the turbine casing 26 of the turbine 13 is supported by a stand 36, and the exhaust chamber 30 is supported by a stand 37.

Therefore, the air inhaled from the air intake 21 of the compressor 11 is compressed by passing through the plurality of compressor vane assemblies 23 and compressor blade assemblies 24 to be a compressed air having high temperature and high pressure. Predetermined fuel is supplied to the compressed air to create combustion in the combustor 12. The combustion gas produced in the combustor 12 having high temperature and high pressure, which is a working fluid, passes through the plurality of turbine nozzle assemblies 27 and turbine blade assemblies 28 constituting the turbine 13, thereby rotationally driving the rotor 32 to drive the generator connected to the rotor 32. On the other hand, the energy of the flue gas (combustion gas) is transformed into pressure by the exhaust diffuser 31 of the exhaust chamber 30, and after reducing the velocity, the flue gas is ejected into atmospheric air.

In the exhaust structure of the turbine 13 as described above, the plurality of turbine nozzle assemblies 27 and turbine blade assemblies 28 is arranged one after the other in the flow direction of the combustion gas in the annular-shaped turbine casing 26, as illustrated in FIG. 1. In the turbine casing 26, the annular-shaped exhaust casing 29 is arranged in the downstream side of the flow direction of the flue gas. In the exhaust casing 29, the annular-shaped exhaust chamber 30 is arranged in the downstream side of the flow direction of the flue gas. In the exhaust chamber 30, the exhaust duct (not illustrated in the drawing) is arranged in the downstream side of the flow direction of the flue gas. Each of the turbine casing 26, the exhaust casing 29, the exhaust chamber 30, and the exhaust duct is configured with an upper half and a lower half which are integrally connected together to form each configuration.

The turbine casing 26 and the exhaust casing 29 are connected with a plurality of connecting bolts 41, and the exhaust casing 29 and the exhaust chamber 30 are connected with a plurality of exhaust chamber supports 42 and 43 each of which can absorb heat expansion. Each of the exhaust chamber supports 42 and 43 is formed in a strip and provided to extend along the axial direction of the turbine 13. A plurality of the exhaust chamber supports 42 and 43 is arranged in the circumference direction of the turbine 13 with a given space in between. The exhaust chamber supports 42 and 43 can absorb heat expansion by deforming themselves, when the heat expansion occurs between the exhaust casing 29 and the exhaust chamber 30 due to temperature difference. Such heat expansion tends to occur during a transition period such as a starting period or under a high load condition of the turbine 13. Further, a gas seal 44 is provided between the exhaust casing 29 and the exhaust chamber 30 to be positioned between the exhaust chamber supports 42 and 43.

An annular-shaped exhaust diffuser 31 constituting the exhaust chamber 30 is arranged inside the exhaust casing 29. An annular-shaped outer diffuser 45 and an inner diffuser 46 are connected by a plurality of strut shield 47 to constitute the exhaust diffuser 31. The strut shield 47 has a hollow structure, such as an annular shape or an elliptical cylinder shape. The plurality of strut shields 47 is provided in the circumferential direction of the exhaust diffuser 31 evenly spaced between each other. Each end portion of the exhaust chamber supports 42 and 43, and the gas seal 44 as described above is connected to the outer diffuser 45 of the exhaust diffuser 31 constituting the exhaust chamber 30.

A strut (support structure) 48 is arranged inside the strut shield 47. One end side of the strut 48 penetrates the inner diffuser 46 and is connected to a bearing casing 49 which contains the bearing 34. The bearing 34 rotatably supports the rotor 32. The other end side of the strut 48 penetrates the outer diffuser 45 and is fixed to the exhaust casing 29. The space inside the strut shield 47 is linked with spaces, such as the space inside the exhaust diffuser 31 (inner diffuser 46) and the space between the exhaust casing 29 and the exhaust diffuser 31 (outer diffuser 45). A cooling air can be supplied to these spaces from outside.

Further, a plurality of turbine nozzle assemblies 27 and turbine blade assemblies 28 is arranged one after the other inside the turbine casing 26. The airfoil ring structure of each of the stages has almost the same configuration. In this case, the turbine nozzle assembly 27 is configured so as that: a plurality of turbine nozzles 27a is arranged in the circumferential direction evenly spaced between each other; an inner shroud 27b is fixed to the proximal end portion in the rotor 32 side; and an outer shroud 27c is fixed to the distal end portion in the turbine casing 26 side. As in a similar manner, the turbine blade assembly 28 is configured so as that: a plurality of turbine blades 28a is arranged in the circumferential direction evenly spaced between each other; the proximal end portion is fixed to a rotor disk 28b which is fixed to the rotor 32; and the distal end portion extends to the turbine casing 26 side. The final-stage turbine blade 28a is arranged in the downstream side of the final-stage turbine nozzle 27a.

The final-stage airfoil ring structure of the turbine casing 26 is configured with a turbine casing main body 51 having an annular-shape, an airfoil ring 52 having an annular-shape provided inside the turbine casing main body 51, a segmented ring 53 formed in an annular shape arranged in the outer side of the final-stage turbine blade 28a, and heat shield rings 54, 55, and 56 which connects the segmented ring 53, the segmented ring 53, and the outer shroud 27c of the final-stage turbine nozzle 27a.

The airfoil ring structure is configured for each stage in the turbine 13 and a combustion gas passage A is configured with components such as the inner shroud 27b constituting the turbine casing 26 and the segmented ring 53. The front portion of the exhaust diffuser 31 intrudes into the inner side of the rear portion of the turbine casing 26 and the exhaust casing 29 with a given space in the radial direction to be connected to the sealing apparatus 57, thereby constituting a flue gas passage B constituted with the exhaust diffuser 31. The combustion gas passage A and the flue gas passage B is continuously connected.

A pressure loss body 61 is provided in the exhaust diffuser 31 in the turbine exhaust structure of the first embodiment configured as described above. The pressure loss body 61 is arranged in the downstream side of the strut 48 in the flow direction of the flue gas. The pressure loss body 61 is provided as a porous member arranged in the flue gas passage B of the exhaust diffuser 31. The pressure loss body 61 is designed so that the pressure losses in the radially outer side (outer diffuser 45) and the inner side (inner diffuser 46) of the flue gas passage B of the exhaust diffuser 31 are smaller than the pressure loss in the radially middle portion.

To describe specifically, the pressure loss body 61 is formed in a ring shape and arranged in the downstream of the strut 48, with the inner circumference portion connected to the diffuser 46 and the outer circumference portion connected to the outer diffuser 45, as illustrated in FIG. 1 and FIG. 2. The pressure loss body 61 is configured with a plurality of rings 62 formed along the circumferential direction of the exhaust diffuser 31 having different diameters and a plurality of spokes 63 formed along the radial direction of the exhaust diffuser 31. The plurality of rings 62 is supported by the inner diffuser 46 and the outer diffuser 45 via the plurality of spokes 63. Regarding the plurality of rings 62 in this case, each gap in the radially outer circumference portion and the inner circumference portion of the exhaust diffuser 31 is determined to be larger than the gap in the radially middle portion. In this manner, the pressure loss body 61 is designed so that the pressure loss in the outer circumference portion and the inner circumference portion is smaller than the pressure loss in the middle portion in the flue gas passage B in the exhaust diffuser 31. The plurality of spokes 63 is arranged in the circumferential direction evenly spaced between each other.

Although the pressure loss body 61 is configured with the plurality of rings 62 and the plurality of spokes 63, the configuration is not limited to this configuration. For example, as described in FIG. 3, when the pressure loss body 64 is formed as a mesh of a wire net and designed so as that each opening ratio of the area R1 of the outer circumference portion and the area R3 of the inner circumference portion is determined to be larger than the opening ratio of the area R2 of the middle portion, the pressure loss body 64 is designed so as that the pressure losses in the outer circumference portion and inner circumference portion are smaller than the pressure loss in the middle portion in the flue gas passage B in the exhaust diffuser 31. Further, as illustrated in FIG. 4, when the pressure loss body 65 is formed as a porous body (porous member) having a given thickness and designed so as that the thickness T1 of the outer circumference side and the thickness T3 of the inner circumference side is smaller than the thickness T2 of the middle portion, the pressure loss body 65 is designed so that the pressure losses in the outer circumference portion and inner circumference portion are smaller than the pressure loss in the middle portion in the flue gas passage B in the exhaust diffuser 31.

Therefore, as illustrated in FIG. 1, the combustion gas flows through the combustion gas passage A so that power is recovered from the combustion gas by the turbine blade assembly 28. Then the gas or the flue gas flows into the flue gas passage B of the exhaust diffuser 31 in which the energy of the flue gas is gradually transformed into pressure, and is ejected to atmospheric air. When the flue gas passes the pressure loss body 61 (64, 65) in the exhaust diffuser 31, the flue gas is controlled to be uniform, thereby obtaining a high amount of pressure recovery. That is, since the pressure loss body 61 is designed so as that the pressure loss in the radially middle portion is high, the flue gas flowing in the region flows toward the radially outer circumference side or the radially inner circumference side, thereby restraining the separation of the flue gas from the inner wall of the outer diffuser 45 or the outer wall of the inner diffuser 46.

As a result, in the conventional configuration, the total pressure of the flue gas is almost constant from radially outer circumference side to the inner circumference side in the exhaust diffuser as illustrated in a dashed line in FIG. 5. Therefore, the separation of the flue gas tends to occur in the vicinity of the wall surface of the outer diffuser or the inner diffuser, thereby reducing the amount of pressure recovery in the exhaust diffuser. On the contrary, in the first embodiment, the pressure loss body 61 is provided in the exhaust diffuser 31 and the pressure loss in the radially middle portion is large, which provides a high total pressure of the flue gas in the outer circumference side and the inner circumference side compared to the total pressure in the middle portion as illustrated in a solid line. Therefore, the separation of the flue gas in the vicinity of the wall surface of the outer diffuser 45 and the inner diffuser 46 is restrained, thereby increasing the amount of pressure recovery in the exhaust diffuser 31.

As described above, in the turbine exhaust structure of the first embodiment, the turbine casing 26 formed in an annular shape to constitute the combustion gas passage A is provided, and the exhaust diffuser 31 formed in an annular shape to constitute the flue gas passage B is connected to the turbine casing 26 to constitute a configuration. The pressure loss body 61 is provided in the exhaust diffuser 31.

Therefore, by providing the pressure loss body 61 in the exhaust diffuser 31, after the power is recovered from the combustion gas in the combustion gas passage A, the flue gas flows into the flue gas passage B of the exhaust diffuser 31 is controlled to be uniform by the pressure loss body 61. Thereby, the separation of the flue gas flow in the vicinity of the wall surface of the exhaust diffuser 31 is restrained, which increases an amount of pressure recovery in this region. As a result, an efficient pressure recovery of the flue gas is carried out, which improves turbine efficiency, thereby enabling improvement of the performance. In this case, since the separation of the flue gas from the vicinity of the wall surface of the exhaust diffuser 31 is restrained, the flow area in the outlet side of the exhaust diffuser 31 can be increased, by which the turbine efficiency can be improved as well as that the length of the exhaust diffuser 31 can be reduced.

Further, in the turbine exhaust structure of the first embodiment, the pressure loss body 61 is a porous member configured with a multiple of rings 62 and a multiple of spokes 63. Therefore, by configuring the pressure loss body 61 with a porous member arranged in the flue gas passage B, not only the efficient pressure recovery can be carried out but also that the stiffness of the exhaust diffuser 31 can be raised while still maintaining the structural simplicity.

Further, in the turbine exhaust structure of the first embodiment, the pressure loss body 61 is designed so as that the pressure losses in the radially outer circumference portion and the inner circumference portion are smaller than the pressure loss in the radially middle portion in the exhaust diffuser 31. Therefore the flue gas flowing in the exhaust diffuser 31 flows from the middle portion in which the pressure loss is large toward the outer circumference portion and the inner circumference portion in which the pressure losses are small. Thereby, the separation of the flue gas in the vicinity of the wall surface of the exhaust diffuser 31 is restrained and the amount of pressure recovery can be increased.

Further, in the turbine exhaust structure of the first embodiment, the strut 48 which penetrates the exhaust diffuser 31 in the radial direction is provided to connect and support the bearing casing 49 and the exhaust casing 29. The pressure loss body 61 is arranged in the downstream side of the strut 48 in the flow direction of the flue gas. Therefore, by arranging the pressure loss body 61 in the downstream side of the strut 48 in which the flue gas tends to separate from the vicinity of the wall surface, the separation of the flue gas from the vicinity of the wall surface of the exhaust diffuser 31 can efficiently be restrained.

Further, in the gas turbine according to the present invention, fuel is supplied to the compressed air, which is compressed in the compressor 11, in the combustor 12 to create combustion. It is configured so that the produced combustion gas is supplied to the turbine 13 to obtain rotational power. The turbine nozzle assembly 27 and the turbine blade assembly 28 are arranged one after another along the flow direction of the combustion gas inside the turbine casing 26 formed in an annular shape. The annular-shaped exhaust diffuser 31 is connected to the rear portion of the turbine casing 26 to constitute the turbine 13. The pressure loss body 61 is provided in the exhaust diffuser 31.

Therefore, by providing the pressure loss body 61 in the exhaust diffuser 31, the flue gas flowing into the exhaust diffuser 31 is controlled to be uniform by the pressure loss body 61, which provides a high total pressure of the flue gas in the outer circumference portion and the inner circumference portion compared to the total pressure in the middle portion of the exhaust diffuser 31. Thereby, the separation of the flue gas in the vicinity of the wall surface of the exhaust diffuser 31 is restrained, which increases the amount of pressure recovery in this region. As a result, an efficient pressure recovery of the flue gas is carried out, which improves turbine efficiency, thereby enabling improvement of the performance of the gas turbine.

Second Embodiment

Figure 7:
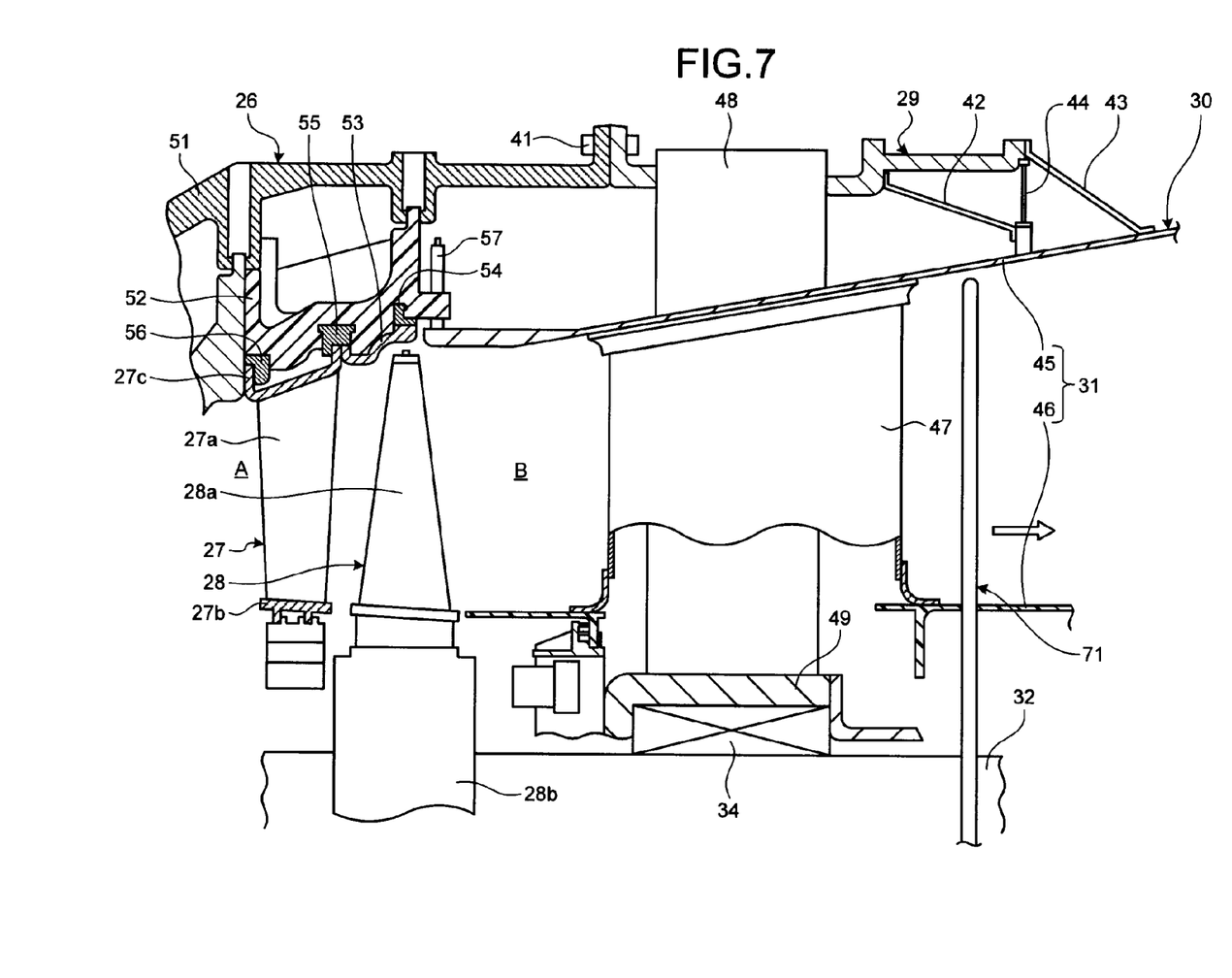
FIG. 7 is a schematic view illustrating a turbine exhaust structure of a gas turbine according to a second embodiment of the present invention.
Figure 8:
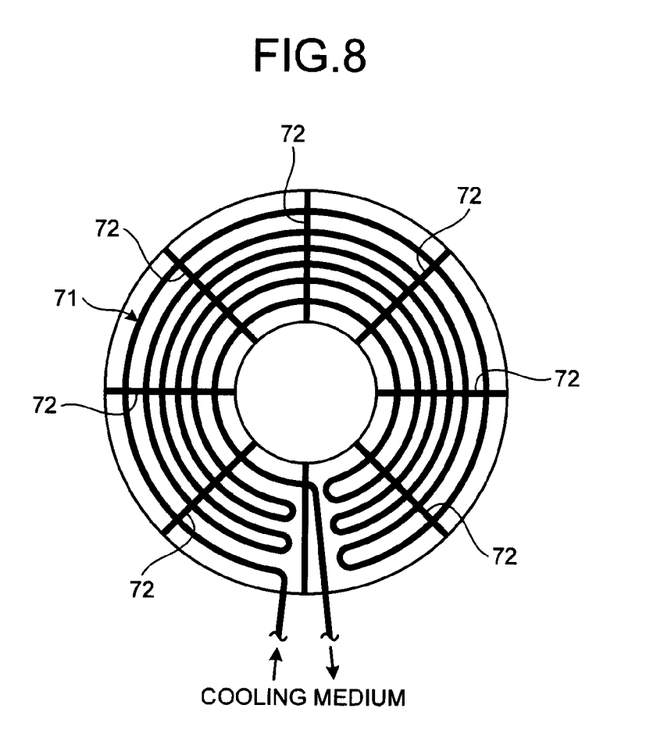
FIG. 8 is a front view illustrating a pressure loss body of a turbine exhaust structure according to the second embodiment.

FIG. 7 is a schematic view illustrating a turbine exhaust structure of a gas turbine according to a second embodiment of the present invention. FIG. 8 is a front view illustrating a pressure loss body of a turbine exhaust structure according to the second embodiment. The same numeral is used for the component having a function similar to that of the component in the Embodiment described above and the detailed description thereof is omitted.

As illustrated in FIG. 7, a heat transfer tube 71 is provided as a pressure loss body in the exhaust diffuser 31 in the turbine exhaust structure of the second embodiment. The heat transfer tube 71 is arranged in the downstream of the strut 48 in the flow direction of the flue gas. The heat transfer tube 71 is designed so as that the pressure loss in the radially outer side and the radially inner side of the exhaust diffuser 31 is smaller than the pressure loss in the radially mid portion.

To describe specifically, as illustrated in FIG. 7 and FIG. 8, heat is exchanged between the flue gas flowing in the exhaust diffuser 31 and the cooling medium (heat exchange medium) flowing inside the heat transfer tube 71. For example, a heat transfer tube for a waste heat recovery boiler, which is not illustrated in the drawing, is applied. The heat transfer tube 71 is arranged so as to be routed back and forth in the circumferential direction in the flue gas passage B of the exhaust diffuser 31. The heat transfer tube 71 is supported by the inner diffuser 46 and the outer diffuser 45 via a plurality of spokes 72. In this case, the heat transfer tube 71 is designed so as that each gap in the radially outer circumference portion and the inner circumference portion of the exhaust diffuser 31 is determined to be larger than the gap in the radially middle portion. Thereby, the pressure losses in the outer circumference portion and the inner circumference portion are determined to be smaller than the pressure loss in the middle portion in the flue gas passage B in the exhaust diffuser 31.

Therefore, the combustion gas flows through the combustion gas passage A so that power is recovered from the combustion gas by the turbine blade assembly 28. Then the gas or the flue gas flows into the flue gas passage B of the exhaust diffuser 31 in which the energy of the flue gas is gradually transformed into pressure, and is ejected to atmospheric air. When the flue gas passes the heat transfer tube 71 in the exhaust diffuser 31, the flue gas is controlled to be uniform, thereby obtaining a high amount of pressure recovery. That is, since the heat transfer tube 71 is designed so as that the pressure loss in the radially middle portion is high, the flue gas flowing in the region flows toward the radially outer circumference side or the radially inner circumference side, thereby restraining the separation of the flue gas from the inner wall of the outer diffuser 45 or the outer wall of the inner diffuser 46. As a result, the amount of pressure recovery is increased in the exhaust diffuser 31.

Further, when the flue gas passes the heat transfer tube 71, heat is exchanged between the flue gas flowing in the exhaust diffuser 31 and the cooling medium flowing inside the heat transfer tube 71, thereby enabling the efficient recovery of the heat of the flue gas.

As described above, in the turbine exhaust structure of the second embodiment, the turbine casing 26 formed in an annular shape to constitute the combustion gas passage A is provided, and the exhaust diffuser 31 formed in an annular shape to constitute the combustion gas passage B is connected to the turbine casing 26 to constitute a configuration. The heat transfer tube 71 is provided in the exhaust diffuser 31 as a pressure loss body.

Therefore, by providing the heat transfer tube 71 in the exhaust diffuser 31, after the power is recovered from the combustion gas in the combustion gas passage A, the flue gas flows into the flue gas passage B of the exhaust diffuser 31 is controlled to be uniform by the heat transfer tube 71. Thereby, the separation of the flue gas flow in the vicinity of the side wall surface of the exhaust diffuser 31 is restrained, which increases the amount of pressure recovery in this region. As a result, an efficient pressure recovery of the flue gas is carried out, which improves turbine efficiency, thereby enabling improvement of the performance. In this case, heat exchange can be carried out between the flue gas flowing in the exhaust diffuser 31 and the cooling medium flowing inside the heat transfer tube 71, and thereby the heat can be recovered from the flue gas which can be used effectively.

In the embodiments described above, the pressure loss bodies 61, 64, 65, and 71 are provided and designed so as that the pressure losses in the radially outer side and the inner side of the exhaust diffuser 31 are smaller than the pressure loss in the radially middle portion of the exhaust diffuser 31. However, it may be designed so as that only the radially outer side or the radially inner side of the exhaust diffuser 31 is smaller than the pressure loss in the middle portion of the exhaust diffuser 31. Further, the pressure loss bodies 61, 64, 65, and 71 are arranged in the downstream of the strut 48 in the flow direction of the flue gas, though it is preferable to provide the pressure loss bodies 61, 64, 65, and 71 in the region in which the flue gas flowing in the exhaust diffuser 31 separates from the wall surface. The pressure loss bodies 61, 64, 65, and 71 may be arranged in the vicinity of, or in the upstream of, the strut 48 according to the shape of the exhaust diffuser 31.

REFERENCE SIGNS LIST 11 compressor
12 combustor
13 turbine
26 turbine casing (casing)
27 TURBINE nozzle assembly
28 TURBINE blade assembly
29 exhaust casing
30 exhaust chamber
31 exhaust diffuser
32 rotor
45 outer diffuser
46 inner diffuser
48 strut (support structure)
61, 64, 65 pressure loss body
62 ring
63 spoke
71 heat transfer tube (pressure loss body)
A combustion gas passage
B flue gas passage

The invention claimed is:
1. A turbine exhaust structure including a casing formed in an annular shape around a central axis to constitute a combustion gas passage, in which an exhaust diffuser formed in an annular shape to constitute a flue gas passage is connected to the casing, comprising:
a pressure loss body which is formed in a ring shape and provided in the exhaust diffuser, wherein the pressure loss body includes a porous member arranged in the flue gas passage of the exhaust diffuser, and an axial thickness of an outer circumference side and an axial thickness of an inner circumference side of the porous member are formed to be thinner than an axial thickness of a middle portion.

2. The turbine exhaust structure according to claim 1, wherein a support structure penetrating the exhaust diffuser in a radial direction is provided, and the pressure loss body is arranged in a downstream side of the support structure in a flow direction of a flue gas.

3. A gas turbine in which a fuel is supplied to the compressed air, compressed in a compressor, in a combustor to create combustion, and the produced combustion gas is supplied to a turbine to obtain rotational power,
comprising the turbine exhaust structure according to claim 1.

4. A turbine exhaust structure including a casing formed in an annular shape to constitute a combustion gas passage, in which an exhaust diffuser formed in an annular shape to constitute a flue gas passage is connected to the casing, comprising:
a pressure loss body which is formed in a ring shape and provided in the exhaust diffuser,
wherein the pressure loss body includes a plurality of heat transfer tubes which are formed in a ring shape and in which heat is exchanged between a flue gas and a heat exchange medium flowing inside the plurality of heat transfer tubes, and a plurality of spokes which support the plurality of heat transfer tubes to the exhaust diffuser, and
a pressure loss of a radially outer side and a pressure loss of a radially inner side are set to be smaller than a pressure loss of a radially middle side.

5. A gas turbine in which a fuel is supplied to the compressed air, compressed in a compressor, in a combustor to create combustion, and the produced combustion gas is supplied to a turbine to obtain rotational power, comprising the turbine exhaust structure according to claim 4.

6. A turbine exhaust structure according to claim 4, wherein the plurality of heat transfer tubes are disposed such that at least one of a gap between adjacent ones of the plurality of heat transfer tubes in a radially outer portion of the exhaust diffuser and a gap between adjacent ones of the plurality of heat transfer tubes in a radially inner portion of the exhaust diffuser become larger than a gap between adjacent ones of the plurality of heat transfer tubes in a radially middle portion of the exhaust diffuser.

7. A turbine exhaust structure including a casing formed in an annular shape to constitute a combustion gas passage, in which an exhaust diffuser formed in an annular shape to constitute a flue gas passage is connected to the casing, comprising:
a pressure loss body which is formed in a ring shape and provided in the exhaust diffuser,
wherein the pressure loss body includes a porous member arranged in the flue gas passage of the exhaust diffuser, and
an opening ratio of an area in an outer circumference portion and an opening ratio of an area of an inner circumference portion of the porous member are greater than an opening ratio of an area of a middle circumference portion of the porous member.

8. A gas turbine in which a fuel is supplied to the compressed air, compressed in a compressor, in a combustor to create combustion, and the produced combustion gas is supplied to a turbine to obtain rotational power, comprising the turbine exhaust structure according to claim 7.

* * * * *